SIGNALING SYSTEM REMOTE CONTROL OF EQUIPMENT FUNCTIONS

Filed April 22, 1958 2 Sheets-Sheet 1

INVENTOR
Clarence H. Stewart
BY
Burns, Doane, Benedict & Irons
ATTORNEYS

SIGNALING SYSTEM REMOTE CONTROL OF EQUIPMENT FUNCTIONS

Filed April 22, 1958 2 Sheets-Sheet 2

INVENTOR
Clarence H. Stewart

BY Burns, Doane, Benedict & Irons
ATTORNEYS 3,060,408
SIGNALING SYSTEM FOR REMOTE CONTROL OF EQUIPMENT FUNCTIONS

Clarence H. Stewart, Evanston, Ill., assignor, by mesne assignments, to Bell & Gossett Company, Morton Grove, Ill., a corporation of Illinois Filed Apr. 22, 1958, Ser. No. 730,110
9 Claims. (Cl. 340—171)

This invention relates generally to a signaling system for remotely and selectively controlling the functioning of equipment and more specifically is directed to a function control unit operable in conjunction with a selective calling receiver whereby a plurality of functions may be selectively controlled by coded signals.

The need for a system for reliably controlling the functioning of equipment, with such control being effected from a remote point has been long established. Such need has gained impetus with the advent of more widespread use of automatic and semiautomatic systems for programing telemetering, etc. Prior systems used for this remote control function generally relied upon pulse or binary coding for the control signals such that either wire connections or a high quality communications link is required between the transmitter and the selective calling receiver-function control unit.

There has been a continued need, for realization of the full potentialities of existing automatic equipment operation programing systems, to provide means for remote function control permitting completely reliable operation over what are normally considered to be marginal circuits. Such a function control need provide flexibility of operation for control of the functions, together with requisite reliability of operation, with the ability of selecting one of a multiplicity of remote locations for control of the functions located at such one location, thereby facilitating operation over what is normally termed a party line circuit.

It is a primary object of the instant invention to provide a function control unit operable in conjunction with and in response to the alerting of a selective calling receiver wherein a multiplicity of functions can be selectively controlled and wherein the number of functions controllable through the unit may be effectively increased without undue equipment complexity.

It is another principal object of this invention to provide a function control unit offering complete flexibility such that the individual activation or deactivation of a function being controlled may be effected without prejudicing the operation of the remaining functions at the location of a particular selective calling receiver.

Another object of this invention is to provide a signaling system combining a selective calling receiver and function control unit at each of a plurality of the remote locations wherein mutually exclusive control of various functions at each receiver location may be carried out following alerting of the particular receiver at such location.

Another object of this invention is to provide a selective calling receiver and function control unit of minimum weight, size and power consumption to enable its use on mobile platforms such as aircraft.

It is also an object of this invention to provide a selective calling receiver and function control unit associated therewith embodying minimum circuit complexities consistent with performance requirements to facilitate adequate maintenance by relatively unskilled and inexperienced personnel.

Generally stated, the signaling system of the instant invention as described in detail hereinafter embodies a function control unit. This unit is connected in the activate circuit of a selective calling receiver, which receiver is alertable in response to a predetermined sequence of code signals representative of the receiver's "call number." The function control unit has first and second relay means conditioned for operation upon alerting of the selective calling receiver with means connecting each of said first and second relay means to respond to predetermined first and second frequency tones respectively. A first and second group of function controls are provided in the unit connected with the activate circuit of the selective calling receiver to be conditioned for actuation by operation of the first and second relay means respectively. These function controls are connected in the unit to respond to predetermined individual frequency tones with the individual frequency tones to which the first group respond corresponding to the individual frequency tones to which the second group respond. In operation, following alerting of the particular selective calling receiver by its "call number" signals, two additional sequential frequency tones successively operate one of said first and second relay means and one of the function controls from one group. The particular one of said relay means operated determines the group from which the second frequency tone selects the particular function control to be operated. To deactivate any previously activated function, a deactivate frequency tone is employed as a third additional frequency tone which effects deenergization of the particular function control.

Although the signaling system including the function control unit of this invention finds particular utility in the field of radio communication, it will be appreciated that the invention is equally usable in wire circuit communication applications.

More particular details and significant features of the invention, in addition to those generally outlined above, will be apparent by reference to the specific description of the illustrated embodiment as set forth hereinafter. Other and more specific objects of this invention, in addition to those set forth above, will also be apparent by reference to the specific description hereinbelow taken in connection with the accompanying drawings in which:

FIGURE 1 illustrates specifically the circuitry embodied in the selective calling receiver while FIGURE 2 illustrates the circuitry embodied in the function control unit of this invention. The broken line identified A—B on FIGURES 1 and 2 represents the break in the interconnecting leads between the selective calling receiver and the function control unit.

*The Selective Calling Receiver*

Figure 1:
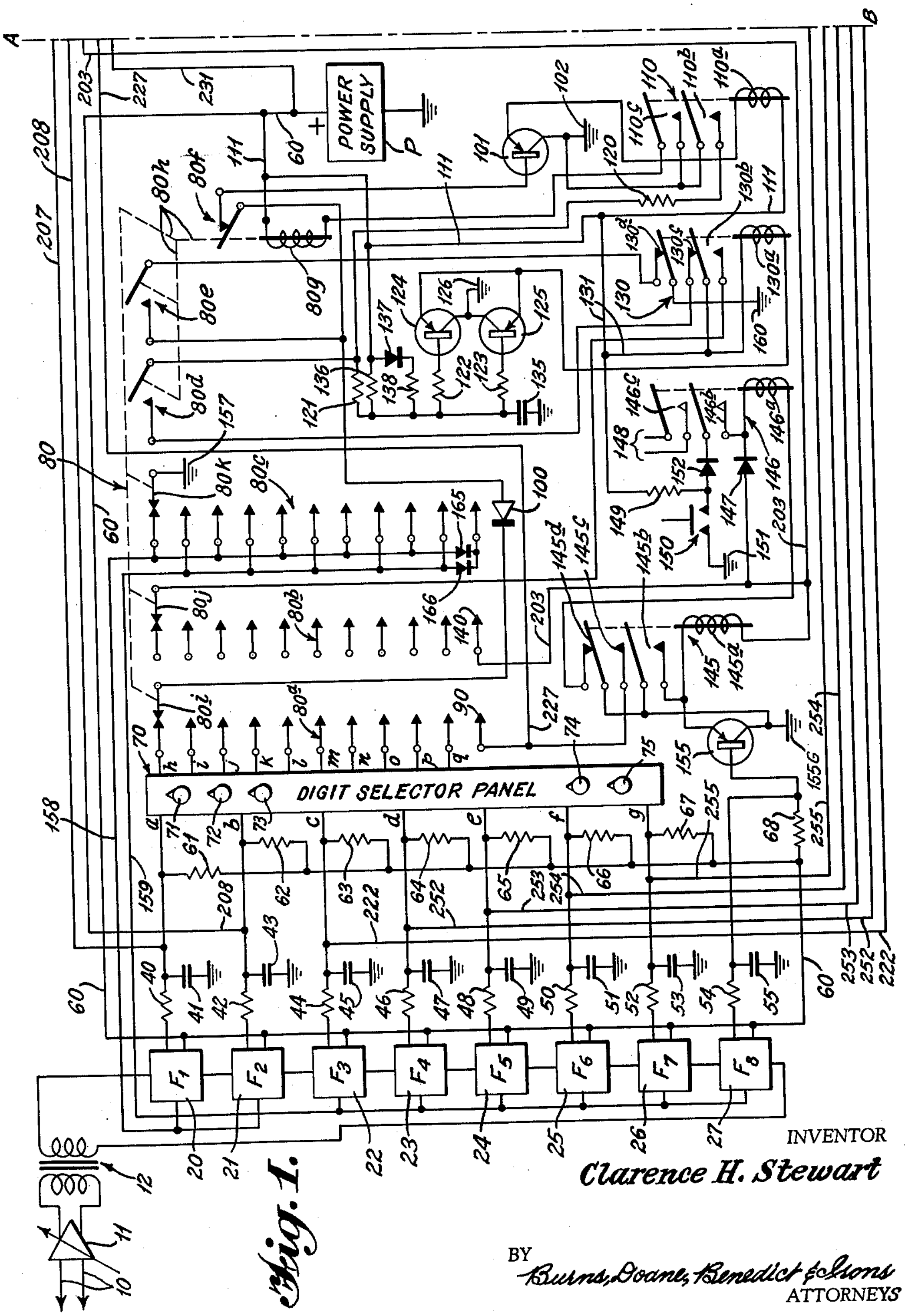
FIGURE 1 is a schematic wiring diagram of the selective calling receiver of the invention.

Referring to FIGURE 1, the incoming audio signals are fed to the receiver through audio input leads 10. It will be appreciated that these signals in a radio communication type system will have been demodulated from the carrier wave as originally transmitted or in a wire circuit will be received direct from a transmitter.

Any suitable transmitter may be employed to alert the particular selective calling receiver and thereafter operate the function control unit as described hereinbelow. In operating with the signaling system of the instant invention, such calling transmitter will generally embody means for sending separate audio frequency tones in sequence, the sequence of tones representing the "call number" for the particular selective calling receiver that is to be alerted. For the particular selective calling receiver hereinafter described, the transmitter will sequentially send two separate frequency tones to represent each digit of the receiver "call number." More specifically, the digit code employed represents each digit by one of two separate single frequencies as the first phase of the digit signal followed by one of five different single frequencies to represent the second phase of the digit signal. The combinations of one of the first phase frequencies with each of the five second phase frequencies and the other of the first phase frequencies with each of the five second phase frequencies enables, by the use of only seven separate frequencies, identification of each of the digits, 1 through 0, by unique first and second frequency tones.

For purposes of illustration it may be assumed that the respective call number digits are represented by frequency tones as follows:

| Digit | First Phase Frequency | Second Phase Frequency |
|---|---|---|
| 1 | $F_1$ | $F_3$ |
| 2 | $F_1$ | $F_4$ |
| 3 | $F_1$ | $F_5$ |
| 4 | $F_1$ | $F_6$ |
| 5 | $F_1$ | $F_7$ |
| 6 | $F_2$ | $F_3$ |
| 7 | $F_2$ | $F_4$ |
| 8 | $F_2$ | $F_5$ |
| 9 | $F_2$ | $F_6$ |
| 0 | $F_2$ | $F_7$ |

In addition to the seven frequencies used in the code, a deactivate or turnoff frequency $F_8$ is also used.

The audio signals fed through leads 10 are amplified and maintained at a constant level by a limiter and audio amplifier 11 and transformed to the appropriate impedance for the frequency responsive means in the receiver by an audio transformer 12. The secondary of transformer 12 is connected in series with the drive coils of frequency responsive means in units 20, 21, 22, 23, 24, 25, 26 and 27. Each of these units is responsive and sensitive to a particular one of eight individual frequencies employed in connection with the selective calling receiver of this invention. As diagrammatically represented on FIGURE 1, the units 20 through 27 are sensitive respectively to frequencies $F_1$–$F_8$ which correspond to the respective output frequencies from the transmitter to be used in alerting the selective calling receiver and in operating the function control unit.

Preferably the receiver structure employs vibrating reeds as frequency sensitive electromechanical devices to respond to the separate audio frequency tones used in conjunction with the calling system of this invention. These reeds form the frequency responsive means in each of units 20 through 27. It will be readily recognized, however, that within the scope of the instant invention, conventional electric filters could be employed to detect and respond to the individual audio frequency tones so as to give an indication in the receiver of the particular tones which have been sent out by the transmitter and are received over input leads 10.

The specific construction of units 20 through 27 is not critical to the instant invention. Generally the unit includes a drive coil and associated armature positioned to set up a magnetic field to excite vibration of the tuned reed in the unit. Thus upon excitation of the drive coil in accordance with the frequency of the reed, the reed vibrates in resonance with this frequency. The reed in the circuit of the unit is grounded. A stationary reed contact is mounted adjacent the reed to be engaged when the reed is excited to vibration. In addition to the frequency responsive device, each of the units 20 through 27 may include an electromechanical reed quenching device which is energizable to release the reed for vibration in accordance with operation of the receiver and upon deenergization serves to quench vibration of the reed.

The stationary reed contact in each of the frequency responsive devices in units 20 through 27 is connected to an integrating circuit. The integrating circuit for unit 20 includes resistor 40 and capacitor 41, for unit 12—resistor 42 and capacitor 43, for unit 22—resistor 44 and capacitor 45, for unit 23—resistor 46 and capacitor 47, for unit 24—resistor 48 and capacitor 49, for unit 25—resistor 50 and capacitor 51, for unit 26—resistor 52 and capacitor 53, for unit 27—resistor 54 and capacitor 55. Potential is applied from a power supply P through lead 60 and resistors 61, 62, 63, 64, 65, 66, 67 and 68 to the integrating circuits respectively. The functioning of such integrating circuits will be more apparent from the description given hereinafter. Suffice it to state that the rapid intermittent grounding effected when the tuned reed in the unit is excited to vibration provides an essentially constant D.C. potential level at the other side of the integrating circuit from the reed contact for control use. The outputs of the respective integrating circuits, with the exception of the integrating circuit for unit 27, are connected to a digit selector panel 70 at *a, b, c, d, e, f* and *g*.

The selective calling receiver, as illustrated on the drawings, is constructed to accommodate a five digit calling code. Thus each of the selective calling receivers, individually located at different remote locations, will be set to be alertable in response to calling code signals representing the five digit "call number" assigned to the particular receiver. To set the "call number" for each receiver, the digit selector panel 70 is provided with five separate switch means, one for each digit in the "call number." Each means is manually adjustable by a knob as shown at 71, 72, 73, 74 and 75. If it be assumed that the receiver is assigned the "call number" 13379, knobs 71 through 75 will be appropriately adjusted to the successive digits of such "call number." In so doing, the switch means operated by knob 71 will interconnect *a* and *c* with digit selector panel output leads *h* and *i*. Thus for the digit "1," the first "call number" digit, the first signal phase will be transferred from *a* to lead *h* and the second signal phase transferred from *c* to lead *i*. Similarly the switch means operated by knob 72 will be set for digit "3" to connect *a* and *e* to leads *j* and *k*, respectively. The switch means operated by knob 73 will be set for digit "3" to connect *a* and *e* to leads *l* and *m*, respectively. The switch means operated by knob 74 will be set for digit "7" to connect *b* and *d* to leads *n* and *o*, respectively, and the switch means operated by knob 75 will be set for digit "9" to connect *b* and *f* to leads *p* and *q*.

A stepping switch 80 is provided to be responsive to the outputs of the integrating circuits as fed through digit selector panel 70. For convenience of illustration, the banks of stepping switch contacts have been illustrated in vertical lines and the off-normal contacts shown in their characteristic open condition at the home position of the stepping switch. These off-normal contacts are closed at all positions of the switch away from the home position. Suitable stepping switches for use in conjunction with the selective calling system of this invention are produced by Automatic Electric Company, as for example Type 44 of this company; and C. P. Clare & Company, as for example Type 11, both of Chicago, Illinois. Accordingly, detailed illustration herein of the stepping switch structure is considered unnecessary.

The general characteristics of these types of stepping switches include three parallel banks of contacts arranged in an arc of 120° with a wiper contact assembly engageable with each bank and having radial wiper contact arms at 120° spacing so that one of such arms will be successively engageable with the spaced contacts in each bank at each stepped position of the switch. The stepping action is effected by a pawl and ratchet mechanism driven by a spring wherein the spring is loaded to perform the stepping by a drive coil so that indirect drive of the stepping switch, through the spring, results from energization of the drive coil. Two sets of off-normal contacts are provided to be opened when the stepping switch wiper contact arms are at home position by cam members rotatable with the wiper contact assemblies.

Essentially the stepping switch 80 has three banks of contacts 80*a*, 80*b* and 80*c*; two sets of off-normal contacts 80*d* and 80*e* and one set of contacts 80*f*. The contacts 80*f* are intermittently opened upon each energization of the stepping switch driving coil 80*g*. The stepping switch driving coil 80*g* upon energization effects through suitable linkage (diagrammatically illustrated at 80*h*), opening of contacts of 80*f*, stepping the wiper contacts 80*i*, 80*j* and 80*k* one step along the contact banks 80*a*, 80*b* and 80*c* respectively, and releases off-normal contacts 80*d* and 80*e* so that such latter contacts close.

The leads *h* through *q* from the digit selector panel 70 are connected respectively to the bank of contacts 80*a* on the stepping switch with the exception of the last contact 90 in such bank. Wiper contact 80*i* of the stepping switch is connected through diode 100 and contacts 80*f* to the base of transistor 101. The collector of transistor 101 is connected to ground 102, and the emitter connected to the coil 110*a* of relay 110. The opposite side of coil 110*a* is connected with power supply P through leads 111 and 60. Energization of relay 110 effects closing of its contacts 110*b* and 110*c*. The former complete the circuit to ground 102 for drive coil 80*g* of the stepping switch which coil is connected to the power supply P by leads 111 and 60.

Energizing drive coil 80*g* steps the stepping switch to the second position moving each of the wiper contacts 80*i*, 80*j* and 80*k* to engage with the second contact in their respective banks. Additionally, as the stepping switch is moved from home position the off-normal contacts 80*d* and 80*e* are closed for a purpose as will be described in detail hereinafter. Contacts 80*f* are also opened upon energizing coil 80*g* to effect interruption of the energizing circuit for coil 110*a* through transistor 101 so that the contacts 110*b* and 110*c* reopen.

During energization of coil 110*a* contacts 110*b* connect ground 102 through resistors 120, 121, 122 and 123 to the bases of transistors 124 and 125. The collectors of transistors 124 and 125 are connected to a common ground 126 and the emitters of these transistors connected through the energizing coil 130*a* of a reset relay 130 to the power supply P through leads 131, 111 and 60.

Reset relay 130 has a long time constant release delay by reason of the provision of a capacitor 135 and a charging resistor 136 in the circuit to the base of transistors 124 and 125. When the contacts 110*b* of relay 110 open, the ground through resistors 120 and 121 to capacitor 135 is removed and the capacitor charge commences to build up through charging resistor 136 which couples the capacitor to power supply P through leads 111 and 60. A diode 137 and resistor 138 are connected in series across resistor 136 to stabilize the charging time for capacitor 135 against possible voltage variations in the power source.

In actual construction of the selective calling system of this invention, a charging time for capacitor 135 of between 300 and 450 milliseconds has been found to be satisfactory. It will, of course, be recognized that depending upon operational requirements of the system, the time constant can be varied by utilization of an appropriate size charging resistor 136. The function of capacitor 135 serves to delay opening of relay 130, which, as will be apparent from the description below, serves to retain the receiver set to respond to the next signal tone, but releases and returns the receiver to its initial condition in the event that the proper signal frequency tone is not received within the time delay for opening relay 130.

With the stepping switch 80 moved to its second position, wiper contact 80*i* is in position to receive a pulse through lead *i* from the digit selector panel 70. At the same time, the quench mechanisms for the reeds in units 22 through 27 will be energized as will be explained in detail hereinafter. Assuming that the proper frequency tone is detected by one of the units 22 through 26, its integrating circuit will be connected, through the switches in the digit selector panel, to lead *i* and thence through wiper contact 80*i*, diode 100, contacts 80*f*, which have reclosed as coil 80*g* is deenergized upon opening of contacts 110*b*, to transistor 101. The transistor will again become conductive to reenergize coil 110*a* of relay 110. Operation of relay 110 again steps the stepping switch 80 and again discharges capacitor 135 so that reset relay 130 is in effect recycled for another time period. Thus, if the correct frequency tones are received in succession within the charging time period of capacitor 135 through resistor 136, after recognition of each previous proper frequency tone, the stepping switch will continue to step to its final position, whereupon wiper 80*i* will close contact 90 and wiper 80*j* will close contact 140, each of these contacts being the last ones in the banks 80*a* and 80*b*, respectively. The closure of contacts 80*j* and 140 in bank 80*b* connects the power supply P with the coil 145*a* to a turn off function relay 145 through leads 60, 111, 131, contacts 130*b* of relay 130, wiper contact 80*j* and contact 140 in bank 80*b*. It will be appreciated that the coil 145*a* of relay 145 has remained energized by reason of the successive proper signal tones having been received, each within the charging time constant of capacitor 135 and charging resistor 136.

Additionally, the closing of wiper contact 80*j* with contact 140 in the stepping switch bank 80*b* applied power supply potential to the coil 146*a* of activate relay 146 through diode 147. Diode 147 is provided in the circuit to isolate the coil 145*a* of relay 145 and preclude its being energized by interfering signals or receipt of turn off frequency tone $F_8$ by itself. This will insure that it can be energized only at the completion of the receipt of a correct series of calling signal tones followed by the turn off frequency tone.

The application of voltage to the coil 146*a* of activate relay 146 causes such relay to be energized, since the other side of its coil is connected to ground 155G through normally closed contacts 145*d* of turn off function relay 145. Thereupon contacts 146*b* and 146*c* of activate relay 146 are closed. Contacts 146*c* may be used to operate equipment within the receiving location through leads 148. It will, of course, be recognized that any appropriate alerting signal, such as a light, buzzer, etc., may be appropriately operated by utilizing closure of contacts 146*c* to effect the desired operation at the receiving station which has been called. Additionally, it will be recognized that, if desired, equipment at the called receiving station may be turned off or on, or otherwise operated by utilization of the potential, derived through contact 140, which in the illustrated embodiment is employed to operate relay 146.

Closure of contacts 146*b* in activate relay 146 sets up a holding circuit to the power supply P through resistor 149, leads 131, 111 and 60, to retain relay coil 146*a* energized, even after relay 130 has become deenergized upon capacitor 135 becoming charged and thus contacts 130*b* of such relay being opened. Relay 146 may be released by manual closing of switch 150 which connects coil 146*a* to ground 151 or, as will be described, the activate relay may be released by receipt of the turn off signal tone. A diode 152 is desirably provided between switch 150 and contacts 146*b* to protect diode 147 against excessive current flow to ground 151 with switch 150 closed, in the event relay contacts 146*b* are slow in opening.

The voltage applied to coil 145*a* of turn off function relay 145 sets up the deactivate circuitry to receive the turn off signal if it is transmitted within the time constant release delay of reset relay 130. When the turn off function is to be performed from the transmitter, the signal frequency tone $F_8$ is transmitted at the end of the proper call signals for the particular receiver to be turned off or otherwise affected. The frequency tones of a "call number" are sent from the transmitter and responded to by the receiver to step stepping switch 80 to the final position where potential is applied to one side of coil 145*a* through contact 140. Frequency tone $F_8$ follows the call signal tones before reset relay 130 is released, whereupon frequency responsive unit 27 detects such turn off frequency tone. Upon such detection the potential on the base of turn off transistor 155 will be reduced through integrating circuit 54—55, the transistor will become conductive and coil 145*a* of turn off function relay 145 will be energized. Energization of this relay breaks the ground connection for the coil of activate relay 146 at contacts 145*d* and at the same time applies ground 155G to the contacts 146*c* and then through contact 90 in stepping switch bank 80*a*, wiper contact 80*i*, diode 100, contacts 80*f* to the base of transistor 101.

This action results in again energizing coil 110*a* of relay 110 in the manner described above, whereupon drive coil 80*g* of the stepping switch is energized to step the switch back to its home or normal position. In this respect, it is again pointed out that the illustration of stepping switch 80 on FIGURE 1 is only diagrammatic and that in the actual structure of a suitable stepping switch the wiper contacts 80*i*, 80*j* and 80*k*, when stepped from the last illustrated contacts in banks 80*a*, 80*b* and 80*c*, move to the first contacts in these banks. Similarly, this last stepping action of the stepping switch will result in camming open the off-normal contacts 80*d* and 80*e*, since these contacts are open only when the stepping switch is at its home or normal position.

Turn off function relay 145 is further provided with contacts 145*c* which connect one side of its coil 145*a* direct to ground 155G when the relay is energized. This serves as a holding circuit to maintain the relay 145 energized until stepping switch 80 completes its cycle back to the home position and insures that the circuits will be deactivated.

Attention may now be directed to the third bank of contacts 80*c* on stepping switch 80 which will successively be engaged by wiper contact 80*k*, which contact is grounded at 157. This bank of contacts is utilized in connection with the operation of the reed quenching mechanism as is provided within each of the units 20 through 27. From the above description, it will be apreciated that alternate ones of the frequency tones in the complete calling signal will be either of frequency $F_1$ or $F_2$. Accordingly, the quench mechanism in units 20 and 21 should be energized to release at every other position of the stepping switch where one of the frequencies $F_1$ or $F_2$ is to be responded to. Thus, the first, third, fifth, seventh and ninth contacts in bank 80*c* are connected together and are connected by lead 158 to energize the quench mechanism in units 20 and 21. Power for the quench mechanisms is derived through lead 60 from power supply P. Thus, when wiper contact 80*k* is in contact with these odd-numbered common connected contacts in bank 80*c*, these quench mechanisms will be energized between ground 157 and power supply P.

Similarly, contacts two, four, six, eight and ten are connected together and connected by lead 159 to one side of each of the quench mechanisms in the units 22 through 27. When wiper contact 80*k* is stepped to a position to engage with one of these latter mentioned contacts in bank 80*c* the quench mechanisms in all of the units 22 through 27 will be energized to release so that the reeds in these units may respond to and sense the appropriate actuating frequency if and when it is received. The last contact in bank 80*c* is connected with both the even-numbered and odd-numbered contacts of the bank. Diodes 165 and 166 are provided in the leads connecting this last contact with the other contacts to prevent energizing all of the quench mechanisms when a contact other than the last contact is grounded at 157 through wiper contact 80*k*. When the last contact in bank 80*c* is connected to ground 157 through wiper contact 80*k*, all of the quench mechanisms in units 20 through 27 will be energized for subsequent response of the frequency responsive means and operation of the function control unit as described hereinafter.

The provision of reed quenching operable as described is of particular importance where the receiver is to respond properly to rapidly succeeding frequency tones in the "call number" signal. Where the audio frequency tones of the "call number" follow one another in rapid succession and no reed quench is provided it may happen that, for example, the reed of $F_1$ will still be vibrating to close its contacts when the stepping switch has moved to the third position, resulting in a receiver improperly detecting and responding to this reed at a time when the $F_2$ reed is intended for response in the particular called receiver at the third stepping switch position. Even where the residual reed vibration has diminished below the point where it makes contact, the vibration build-up time of a reed in response to its resonant frequency will not be the same where the drive frequency acts on the reed in phase with its residual vibration as compared with such build-up time when the drive frequency starts to act on the reed out of phase with the residual vibration remaining from the last reed operation. Thus, more reliable and accurate operation of the frequency responsive reeds results where their vibration is quenched after each operation so that in responding they build-up vibration from the stationary neutral position.

*Receiver Operation*

In the description of the receiver circuitry as given hereinabove, mention of the receiver operation has necessarily been set forth. By way of illustration the response of the receiver to a particular "call number" will be set forth hereinafter.

Merely for purposes of illustration it may be assumed that the digit selector panel 70 has the ganged switches therein adjusted so that the receiver will respond to the "call number" 13379. Also for purposes of the present illustration, it will be assumed that proper frequency tones are being transmitted in proper sequence to call the particular receiver as shown in FIGURE 1.

The integrating circuit for frequency $F_1$, resistor 40 and capacitor 41, is connected through lead *a*, and lead *h* to the first contact in the stepping switch bank 80*a*. The integrating circuit resistor 44 and capacitor 45 for frequency $F_3$ is connected through lead *c*, and lead *i* to the second contact in bank 80*a*. These two contacts as so connected are set up to respond only to the frequency tones which uniquely define digit one, namely, $F_1$ and $F_3$, and any other frequency tone which may appear will not be transferred to the stepping switch by reason of the setting of the switches in the digit selector panel. To respond to the second digit in the "call number," the third and fourth contacts in the stepping switch bank 80*a* are coupled to the integrating circuits of frequencies $F_1$ and $F_5$. Since the third digit of the "call number" is the same as the second digit, namely three, the fifth and sixth contacts are also connected to the integrating circuits for frequencies $F_1$ and $F_5$ respectively. Digit seven, which is the fourth digit of the "call number," is represented by contacts seven and eight in the stepping switch bank 80*a* and are respectively connected through switches in the digit selector panel to the integrating circuits of frequencies $F_2$ and $F_4$. The last digit, nine, is represented by the ninth and tenth contacts on bank 80*a* and is connected to the integrating circuits of the frequency responsive means for frequencies $F_2$ and $F_6$.

The receipt of the "call number" 13379 is initiated by the frequency tone $F_1$ being received at the input terminals 10, amplified and maintained at a constant voltage level by the limiter and audio amplifier 11 and transformed to the appropriate impedance for the drive coils of the reeds by the audio transformer 12. The current flowing in the series loop, consisting of the secondary of the audio transformer 12 and the drive coils, being at the resonant frequency of the reed in unit 20, causes this reed to vibrate and make contact. This intermittent making and breaking at the reed results in the integrating circuit of resistor 40 and capacitor 41 providing an essentially constant level voltage at the first contact in the stepping switch bank 80*a* through the digit selector panel as explained above. This first contact is connected through wiper contact 80*i*, diode 100 and interrupter contacts 80*f*, which are normally closed, to the base of drive transistor 101, whereupon the transistor becomes conductive to allow current flow in the coil of relay 110. Upon closure of the contacts of relay 110 the ground return path for stepping switch drive coil 80*g* is completed and also ground is applied at the bases of the long time constant control transistors 124 and 125, by way of resistors 120, 121, 122 and 123. Consequently, reset relay 130 is energized, as is the stepping switch drive coil 80*g*. Thus, the stepping switch moves to the second position, where wiper contact 80*i* engages the second contact.

After a sufficient length of time has elapsed for these operations to take place, frequency $F_3$ will be received, which causes the reed in unit 22 to vibrate and make contact. These contacts, after integration, are reflected through the digit selector panel at the second contact in stepping switch bank 80*a*, which contact is now engaged by wiper contact 80*i*. Again relay 110 is energized and the stepping switch moved to the third position while the long time constant release delay of reset relay 130 is recycled by reason of capacitor 135 being grounded when relay 110 was reenergized.

This completes recognition of the first call digit. If the second frequency which defined digit one had not been received within the charging time of capacitor 135 through resistor 136 the stepping switch would have stepped back to its home position, as described hereinafter.

The sequence of operations as described in detail with respect to the first digit are continued so that the stepping switch 80 steps in order to the final position where wiper 80*i* engages contact 90 in bank 80*a*. Since reset relay 130 remains energized for the release delay period after the response to the last call signal tone, voltage is applied to contact 140 in stepping switch bank 80*b* by way of wiper contact 80*j* causing the activate relay 146 to be energized and also setting up the deactivate or turn off circuitry to receive the turn off signal. In the absence of receipt of the turn off signal within the time constant for release of relay 130, such relay is deenergized, thus closing its contacts 130*c* and 130*d*, resulting in the stepping switch 80 stepping to the home position, since the off-normal contacts 80*d* and 80*e* are closed until the home position of the stepping switch is reached.

It will be readily appreciated that during the successive stepping operations of the stepping switch 80, the grounded wiper contact 80*k* will have successively moved across the stationary contacts of bank 80*c* to energize the quench mechanisms for the first phase frequencies $F_1$ and $F_2$ as detected by units 20 and 21 when the grounded wiper contact is engaged with contacts one, three, five, seven and nine of bank 80*a* and similarly will have energized the quench coils in the units 22 through 27 when the grounded wiper contact 80*k* is engaged with contacts two, four, six, eight, ten and eleven on the stepping switch bank 80*c*. Thus, the frequency sensitive reeds will have been freed to respond to their resonant frequency excitation at the proper time and their vibration quenched after each response.

Description will now be given as to the functioning of the off-normal contacts 80*d* and 80*e*. These two contacts are employed to insure that should the receiver commence to respond to a "call number" having the initial digits similar to its own "call number," the receiver will be returned to its normal condition when it is detected that a complete "call number" has not been received within the proper time interval between successive signal tones. As has been explained, when a receiver is responding to its proper "call number" signal tones, the reset relay 130 is continuously energized, since each signal tone is successively received within the drop-out time for such relay as set by the charging time for capacitor 135 through resistor 136. As each signal tone is detected, the time release delay for relay 130 is recycled.

While relay 130 is energized its contacts 130*c* and 130*d* are opened. If an incomplete or defective call has caused the receiver to partially respond, the stepping switch 80 will be at a position intermediate the home and last steps. Off-normal contacts 80*d* and 80*e* will be closed. When the proper signal tone to cause a further stepping action is not forthcoming within the release time of relay 130, capacitor 135 will become charged, causing relay coil 130 to be deenergized, whereupon contacts 130*c* and 130*d* are closed. Thereupon potential will be connected from power supply P through leads 60, 111, 131 and contacts 130*c* to off-normal contacts 80*d*. The potential is applied through contacts 80*d* to keep capacitor 135 charged through resistor 121. With the capacitor so charged, reset relay 130 will be maintained deenergized with its contacts 130*c* and 130*d* closed.

Contacts 130*d* connect ground 160 through off-normal contacts 80*e* of the stepping switch to apply ground to the base of drive transistor 101 through contacts 80*f* on the stepping switch and also to the anode of diode 100. It may be pointed out that diode 100 is provided in the circuit to prevent the ground as applied through off-normal contacts 80*e*, when reset relay 130 is deenergized, from inadvertently discharging one of the capacitors 41 through 55 in the integrating circuits for frequency detecting units 20 through 27.

The ground which is thus placed on the base of the drive transistor 101 causes current to flow in the coil of drive relay 110, energizing it to cause the stepping switch coil 80*g* to be energized so that the stepping switch steps to the next position. By virtue of the fact that voltage is applied through off-normal contacts 80*d* and resistor 121 to maintain capacitor 135 charged and thereby retain relay 130 in its deenergized condition, the stepping switch will continue to step until it reaches the home position, whereupon off-normal contacts 80*d* and 80*e* are opened. This repetitive stepping action occurs by reason of the interconnection of relay 110 with contacts 80*f* and coil 80*g* of the stepping switch. Each time coil 110*a* of relay 110 is energized to close the circuit for stepping switch drive coil 80*g*, stepping switch contacts 80*f* are in turn opened to deenergize coil 110*a* of relay 110 through the action of transistor 101. When the stepping switch returns to its home position, the receiver circuit is ready to receive a correct call.

It should be pointed out that the activate relay 146 and the turn off or deactivate circuitry are not conditioned to respond when the receiver is stepped back to its home position, as may take place when erroneous or incomplete call signal tones are partially responded to, since wiper contact 80*j* does not have potential applied thereto when it engages contact 140 in bank 80*b* while contacts 130*b* of reset relay 130 are open, as is the case when relay 130 is deenergized during the stepping back or return to home position of the stepping switch 80. It will thus be seen that if the stepping switch is moved to the second position or through any number of the positions by erroneous signals or noise, the call will not be completed, since if at any position of the stepping switch the correct frequency tone is not received within the time constant release delay for relay 130, the stepping switch will step back to its home position. Consideration of the operation thus described shows that the system is quite invulnerable to erroneous triggering and since the only timing provides for wide safety margins, the performance under heavy noise or degrading circuit conditions will be excellent.

From the description given hereinabove, it will be appreciated that the selective calling receiver may be readily expanded with a minimum of change in the apparatus construction. The digit selector panel 70 as employed in the receiver, may be enlarged to accommodate "call numbers" of more than five digits by the mere addition of appropriate switch means for each additional digit above five which is to be accommodated by the system. In such event, the transmitter in alerting the particular selective calling receiver will send two additional frequency tones for each additional digit. For each additional digit in the "call number" the stepping switch in the receiver will be provided with two additional contacts in each of its banks, connected into the circuit so that for a six digit "call number" the stepping switch will have to respond to twelve instead of ten separate tones.

*The Function Control Unit*

Figure 2:
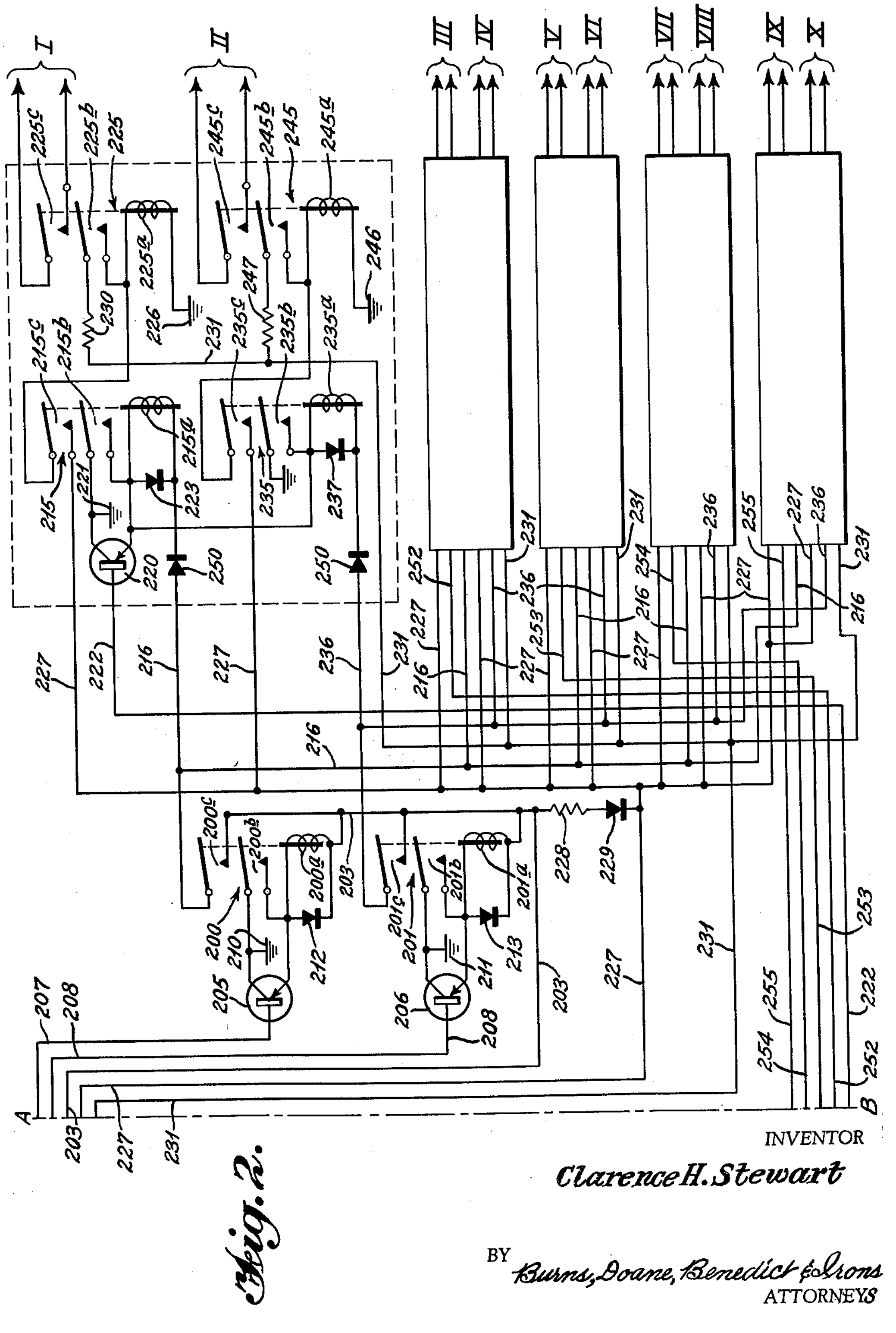
FIGURE 2 is a schematic wiring diagram of a function control unit connected with the circuitry of FIGURE 1.

The selective calling receiver as shown in schematic detail in FIGURE 1 has interconnected therewith a function cotrol unit as shown in schematic detail in FIGURE 2, the interconnecting leads being disposed along line A—B on these two figures. The function control unit illustrated enables selective control of ten separate equipment functions in response to two additional frequency tones received subsequent to alerting the selective calling receiver.

Referring to FIGURE 2, the function control unit embodies a pair of conditioning relays or circuit pickup devices 200 and 201. A lead 203 is connected to the coils 200*a* and 201*a* of these relays and to the contact 140 in contact bank 80*b* on the stepping switch 80 (FIGURE 1).

Control elements, such as transistors 205 and 206 are connected in the respective ground circuits for controlling energizing circuits to the coils of relays 200 and 201. The base of transistor 205 is connected by a lead 207 to the integrating circuit 40—41 for frequency responsive unit 20 (FIGURE 1). Similarly, the base of transistor 206 is connected by a lead 208 to the integrating circuit 42—42 for frequency responsive unit 21. The emitter of transistor 205 is connected to coil 200*a* of control relay 200 while the collector of this transistor is connected to ground 210. The emitter of transistor 206 is connected to coil 201*a* of control relay 201 while the collector of such transistor is connected to ground 211. Diodes 212 and 213 are connected across coil 200*a* and 201*a*, respectively, to serve as overvoltage protection for control transistors 205 and 206.

Contacts 200*b* provide a holding circuit between ground 210 and coil 200*a* for relay 200 once control transistor 205 has permitted energization of the relay by voltage on lead 203. Similarly, contacts 201*b* provide a holding circuit between ground 211 and coil 201*a* for relay 201 once control transistor 206 permits energization of the relay by voltage on lead 203.

In the specific embodiment illustrated, the conditioning relays 200 and 201 are connected in the energizing circuits for a series of function controls. These function controls include two groups of five each with conditioning relay 200 connected to condition the function controls of the first group for operation and conditioning relay 201 connected to condition the function controls of the second group for operation. For convenience in illustration on FIGURE 2 one of the function controls from each group is shown in schematic detail in the dotted line block.

Each function control includes a drive relay and an output relay with control of the drive relay operation being maintained through a drive transistor or control element connected in the energizing circuit of the relay coil. As shown on FIGURE 2, the coil 215*a* of drive relay 215 is connected by lead 216 with contacts 200*c* of relay 200. Drive transistor 220 has the emitter thereof connected to coil 215*a* and the collector connected to ground 221. The base of this transistor is connected by lead 222 to the integrating circuit 44—45 of frequency responsive unit 22. Contacts 215*b* of drive relay 215 are connected to retain the relay in its energized state by voltage on lead 216 once the relay is energized. An overvoltage protection diode 223 is provided, connected across coil 215*a*.

An output relay 225 has the coil 225*a* thereof connected between contacts 215*c* of drive relay 215 and ground 226. The other side of contacts 215*c* are connected through lead 227 to lead 203 by resistor 228 and diode 229 in series. It will be seen that voltage applied to lead 203, which energized conditioning relays 200 or 201 under control of transistors 205 and 206, will pass resistor 228 and diode 229 to energize output relay 225 upon closure of contacts 215*c* of drive relay 215. It may be pointed out that the diode 229 is provided in order to maintain adequate isolation between the turn off or deactivate function and the initial operation performed by control transistors 205 and 206. It is also pointed out that lead 227 connects with contacts 145*b* of turn off function relay 145 (FIGURE 1). This latter connection is important in the deactivate or turn off operation for the function control unit described hereinafter.

Contacts 225*b* of output relay 225 are connected through resistor 230 and lead 231 to power supply P (FIGURE 1). It will thus be seen that upon energization of output relay 225 its contacts 225*b* close to set up a holding circuit maintaining such relay energized through lead 231 until released in a manner described hereinafter. Contacts 225*c* may be disposed in the circuit I of the particular function to be controlled.

The second of the function controls shown in schematic detail in FIGURE 2 includes a drive relay 235 which is connected by lead 236 to contacts 201*c* of conditioning relay 201. The coil 235*a* of this relay is connected to drive transistor 220. An overvoltage prevention diode 237 is connected across coil 235*a*. Contacts 235*b* are connected to provide a holding circuit for relay 235 once it has been energized through transistor 220.

An output relay 245 has the coil 245*a* thereof connected between contacts 235*c* of relay 235 and ground 246. Contacts 245*b* are connected through resistor 247 to lead 231. Contacts 245*c* are provided for connection in the circuit II of the function to be controlled by this particular output relay.

An isolation diode 250 is provided in the lead to the coil of each of the drive relays to preclude misoperation or improper response of the drive relays.

Each function control, including a drive relay and an output relay, is conditioned for operation by energization of either conditioning relay 200 or 201. Each of the blocks shown on FIGURE 2 includes therein circuitry similar to that shown enclosed in the dotted line block and hereinabove described. Thus conditioning relay 200 is connected to a group of five separate function controls and conditioning relay 201 is connected to a second group of five function controls. The drive transistor, such as 220, is connected to control two of the function controls, one from each group.

The drive transistor within each block has the base thereof connected to a different integrating circuit of the frequency responsive units in the selective calling receiver. Thus, lead 252 from the base of the drive transistor in the second block is connected with the integrating circuit 46—47 of frequency responsive unit 23. Lead 253 from the base of the drive transistor in the third block is connected with the integrating circuit 48—49 of frequency responsive unit 24. Lead 254 from the base of the drive transistor in the fourth block is connected to the integrating circuit 50—51 of frequency responsive unit 25 and lead 255 from the base of the drive transistor in the fifth block is connected to the integrating circuit 52—53 of frequency responsive unit 26.

The function controls in the respective blocks have the output relays thereof provided with contacts to be connected in circuits III—X to effect the desired operation of the plurality of equipment functions to be controlled.

*Function Control Unit Operation*

The operation of alerting the selective calling receiver in response to the frequency tones representative of the receiver's "call number" has been described hereinabove. Immediately following alerting of the receiver, the stepping switch has the wiper contacts 80*i*, 80*j* and 80*k* engaged with the last contacts on the contact banks 80*a*, 80*b* and 80*c*. The reset relay 130 remains energized for the charging time of capacitor 135. In this state, positive voltage from power supply P is applied through leads 60, 111, 131, contacts 130*b*, wiper contact 80*j* to contact 140 in bank 80*b*. This positive voltage is applied through lead 203 to the coils of conditioning relays 200 and 201. A frequency tone received at this time corresponding to the tuned frequency of the unit 20 or 21 will result in diminishing the voltage in the integrating circuit for the particular unit. The voltage change is reflected through leads 207 and 208 to the respective control transistors 205 and 206.

If it be assumed that a signal $F_1$ is received, unit 20 will respond and, through lead 207, will result in transistor 205 becoming conductive such that conditioning relay 200 will be energized. The energization of this relay closes its holding circuit through contacts 200*b* and closes contacts 200*c* whereupon the positive voltage on lead 203 is applied through lead 216 and isolating diode 250 to the coil of drive relay 215.

The second signal phase to effect a particular function operation will correspond to one of the frequencies $F_3$ through $F_7$. Assuming that this second signal phase is frequency tone $F_3$ and is received during the holding time of reset relay 130, unit 22 will respond and will apply through lead 222 a potential rendering drive transistor 220 conductive. Thereupon, drive relay 215 becomes energized closing a holding circuit through its contacts 215*b*.

The drive relay contacts 215*c* complete a circuit through lead 227, diode 229, resistor 228 and lead 203 to energize output relay 225. Upon energization of output relay 225, its contacts 225*c* close to effect the appropriate equipment function operation in circuit I. It will be noted that contacts 225*b* on closure set up a second energizing source for relay 225 through resistor 230 and lead 231. Thus, upon release of reset relay 130 as occurs upon charging of capacitor 135, the voltage on contact 140 in contact bank 80*b* of the stepping switch is interrupted through relay contacts 130*b*. Thus, the energizing voltage for the control relay and the drive relay is removed and these relays immediately release. Release of these relays has no effect upon the particular output relay which has been energized since it is kept energized through lead 231 from power supply P.

Following the above described operation, the stepping switch 80 in the selective calling receiver has returned to its home position and the particular control relay and drive relay in the function control unit are deenergized. The output relay 225 remains in its energized condition until a turn off or deactivate operation is performed.

Considering the operation to turn off or deactivate a particular output relay in the function control unit, the selective calling receiver is again alerted in response to code signals representing its "call number." The two frequency tones for the particular control transistor and drive transistor respectively, are sent within the holding time of reset relay 130.

In the example described hereinabove, the output relay 225 was energized. Assuming that it is desired to deenergize this particular output relay, the signals $F_1$ and $F_3$ would be responded to in succession to again energize control relay 200 and drive relay 215. At this time energization of relay 215 will have no effect on output relay 225 since it is already in an energized state.

Immediately following frequency tones $F_1$ and $F_3$ the turn off or deactivate frequency tone $F_6$ is transmitted. Receipt of this tone renders turnoff transistor 155 conductive, whereupon turnoff function relay 145 is energized between ground 155G and its connection with contact 140 on stepping switch 80. At this time the stepping switch wiper contact 80*j* is in engagement with contact 140 wih reset relay 130 still energized within the charging time of capacitor 135 so that voltage is applied through relay contacts 130*b*.

Upon energization of turnoff function relay 145 its contacts 145*b* set up a holding circuit to keep the relay energized while the turnoff or deactivate function is being carried out. Contacts 145*c* of deactivate relay 145 close to connect ground 155G with lead 27. At the same time this ground is connected through contact 90, wiper contact 80*i* of the stepping switch, diode 100 and contacts 80*f* to render transistor 101 conductive so that the stepping switch will be stepped back to its home position as heretofore described. The ground applied to lead 27 shorts out the voltage applied to coil 225*a* of output relay 225 permitting such output relay to release. As the stepping switch returns to is home position, the energizing voltage through contact 140 and lead 203 is interrupted so that the previously energized control relay 200 and drive relay 215 release. Thus, the function control unit and the selective calling receiver are returned to their original condition.

It will be appreciated that by the interconnection of the respective control relays, drive relays and output relays as described hereinabove, any one of the output relays may be selectively energized or selectively deenergized without effecting any of the other output relays. Thus the function control unit enables mutually exclusive operation to activate or deactivate a particular equipment function control. The function control is simply effected by alerting the selective calling receiver and thereafter sending two frequency tones to perform the desired function operation. Where the deactivate function is to be carried out, the receiver is alerted, the two frequency tones for the particular function are responded to, followed immediately by the deactivate frequency tone.

Mention has previously been made of the capability for increased versatility of the selective calling receiver for more than five digit "call numbers." It will be readily recognized that in the function control unit, although relays have been illustrated and described as the output control element, other elements or comparable circuits may be employed to provide for information storage and further versatility in operating functions or utility for the function control unit. Additionally, as in the case of the selective calling receiver, more than ten functions can be controlled by providing the requisite additional function controls and frequency responsive means to operate such added function controls. Thus for each frequency responsive unit and frequency tone used, two more function controls, one connected to be conditioned by each conditioning relay, could be added to give twelve instead of ten control functions.

It may be further pointed out with respect to the function control unit that such unit can respond to a series of appropriate frequency tones sensed after the selective calling receiver has been alerted. For example, after operating either conditioning relay 200 or 201, two successive frequency tones may be responded to, to successively operate two of the five drive relays 215 or five drive relays 225, resulting in two functions being energized. Similarly, the function control unit may operate two function controls simultaneously in response to signal tones for both conditoning relays 200 and 201, followed by a single tone to render one of the drive transistors 220 conductive. With both conditioning relays 200 and 201 operated when a drive transistor 220 becomes conductive, two drive relays 215 and 235 will be simultaneously energized, resulting in two function controls being operated. It will be readily recognized that this feature of the function control unit contributes flexibility to its use.

I claim:

1. In a signaling system, a function control unit connectible to be actuated by distinguishable code signals for selectively effecting equipment functioning control, a pair of conditioning relays, a separate control transistor in the energizing circuit of each of said relays, each control transistor being connected to be rendered conductive in response to a particular code signal, a plurality of function controls each including a drive relay, each conditioning relay having contacts thereof connected in the energizing circuit of the drive relays of a group of said function controls to condition such drive relays for actuation, a drive transistor connected in the energizing circuit of the drive relays of pairs of said function controls, said pairs being made up of one function control from each group of function controls, each drive transistor being connected to be rendered conductive in response to a particular code signal.

2. In a signaling system, a function control unit connectible to be actuated by distinguishable code signals for selectively effecting equipment functioning control, a pair of conditioning relays, a separate control transistor in the energizing circuit of each of said relays, each control transistor being connected to be rendered conductive in response to a particular code signal, a plurality of function controls each including a drive relay and an output relay controlling an output circuit, each conditioning relay having contacts thereof connected in the energizing circuit of the drive relays of a group of said function controls to condition such drive relays for actuation, a drive transistor connected in the energizing circuit of the drive relays of pairs of said function controls, said pairs being made up of one function control from each group of function controls, each drive transistor being connected to be rendered conductive in response to a particular code signal, and means connecting said drive relay and the output relay associated therewith for energization of such output relay through its drive relay.

3. In a signaling system, a function control unit connectible to be actuated by distinguishable code signals for selectively effecting equipment functioning control, a pair of conditioning relays, a separate control transistor in the energizing circuit of each of said relays, each control transistor being connected to be rendered conductive in response to a particular code signal, a plurality of function controls each including a drive relay and an output relay controlling an output circuit, each conditioning relay having contacts thereof connected in the energizing circuit of the drive relays of a group of said function controls to condition such drive relays for actuation, a drive transistor connected in the energizing circuit of the drive relays of pairs of said function controls, said pairs being made up of one function control from each group of function controls, each drive transistor being connected to be rendered conductive in response to a particular code signal, means connecting said drive relay and the output relay associated therewith for energization of such output relay through its drive relay, and means for retaining an energized output relay in such state until receipt of a deactivate code signal.

4. In a signaling system, a selective calling receiver individually alertable in response only to a call signal representing the call number for said receiver, said receiver having an activate circuit energized upon said receiver being alerted, a function control unit for effecting various equipment functions to which it is connected and having a plurality of function controls, a separate energizing circuit for each function control, a number of electric circuit means each coupled to said activate circuit to be enabled thereby when said receiver is alerted by said call signal and each controlling connection of the activate circuit to the energizing circuits of a corresponding group of said function controls, a number of separate first control means each responsive to a separate first distinctive frequency tone received after energization of said activate circuit and each connected to control a corresponding one of said electric circuit means to connect the activate circuit to the energizing circuits of the corresponding group, and a plurality of separate second control means each responsive to a separate second distinctive frequency tone received after one of said first tones and each connected to complete the energizing circuits to certain of said function controls to control selection of a distinctive set comprised of said certain function controls, each set comprising a single function control from each one of said groups such that a function control is selected only if its energizing circuit is connected both in the group determined by the first tone and in the set determined by the second tone.

5. In a signaling system, a selective calling receiver individually alertable in response only to a call signal representing the call number for said receiver, said receiver having an activate circuit energized for a predetermined time upon said receiver being alerted, a function control unit for effecting various equipment functions to which it is connected and having a plurality of function controls, a separate energizing circuit for each function control, a number of electric circuit means each coupled to said activate circuit to be enabled thereby for said predetermined time when said receiver is alerted by said call signal and each controlling connection of the activate circuit to the energizing circuits of a corresponding group of said function controls, a number of separate first control means each responsive to a separate first distinctive frequency tone received after energization of said activate circuit and within said predetermined time and each connected to control a corresponding one of said electric circuit means to connect the activate circuit to the energizing circuits of the corresponding group, and a plurality of separate second control means each responsive to a separate second distinctive frequency tone received after one of said first tones and within said predetermined time and each connected to complete the energizing circuits to certain of said function controls to control selection of a distinctive set comprised of said certain function controls, each set comprising a single function control from each one of said groups such that a function control is selected only if its energizing circuit is connected both in the group determined by the first tone and in the set determined by the second tone.

6. In a signaling system, a selective calling receiver individually alertable in response only to a call signal representing the call number for said receiver, said receiver having an activate circuit energized for a predetermined time upon said receiver being alerted, a function control unit for effecting various equipment functions to which it is connected and having a plurality of function controls, a separate energizing circuit for each function control, a number of electric circuit means each coupled to said activate circuit to be enabled thereby for said predetermined time when said receiver is alerted by said call signal and each controlling connection of the activate circuit to the energizing circuits of a corresponding group of said function controls, a number of separate first control means each responsive to a separate first distinctive frequency tone received after energization of said activate circuit and within said predetermined time and each connected to control a corresponding one of said electric circuit means to connect the activate circuit to the energizing circuits of the corresponding group, and a plurality of separate second control means each responsive to a separate second distinctive frequency tone received after one of said first tones and within said predetermined time and each connected to complete the energizing circuits to certain of said function controls to control selection of a distinctive set comprised of said certain function controls, each set comprising a single function control from each one of said groups such that a function control is selected only if its energizing circuit is connected both in the group determined by the first tone and in the set determined by the second tone, holding means for maintaining a responded function control in such state, and means responsive upon said receiver being realerted by said call signal followed within said predetermined time by said first and second distinctive frequency tones and by a deactivate tone for disabling the holding means at the particular function control selected.

7. In a signaling system, a selective calling receiver individually alertable in response only to a call signal representing the call number for said receiver, said receiver having a first plurality of distinctive frequency tone responsive elements for response to certain portions of the call signal, a second plurality of distinctive frequency tone responsive elements for response to other portions of the call signal, and an activate circuit energizable upon said receiver responding to its call signal through operation of certain of said first plurality of frequency responsive elements and certain of said second plurality of frequency responsive elements, a function control unit for effecting various equipment functions to which it is connected and having a plurality of function controls, a separate energizing circuit for each function control, a number of electric circuit means each coupled to said activate circuit to be enabled thereby when said receiver is alerted by said call signal and each controlling connection of the activate circuit to the energizing circuits of a corresponding group of said function controls, a number of separate first control means each responsive to a different one of said first plurality of frequency responsive elements to operate when a first distinctive frequency tone is received after energization of said activate circuit and each connected to control a corresponding one of said electric circuit means to connect the activate circuit to the energizing circuits of the corresponding group, and a plurality of separate second control means each responsive to a different one of said second plurality of frequency responsive elements to operate when a second distinctive frequency tone is received after one of said first tones and each connected to complete the energizing circuits to certain of said function controls to control selection of a distinctive set comprised of said certain function controls, each set comprising a single function control from each one of said groups such that a function control is selected only if its energizing circuit is connected both in the group determined by the first tone and in the set determined by the second tone.

8. In a signaling system, a selective calling receiver individually alertable in response only to a call signal representing the call number for said receiver, said receiver having an activate circuit energized upon said receiver being alerted, a function control unit for effecting various equipment functions to which it is connected and having a number of circuit pick-up devices, a separate control element in a separate energizing circuit for each of said devices, each control element being responsive to a particular code signal to establish a circuit through its corresponding pick-up device, a plurality of function controls each including a drive device and a separate energizing circuit for each drive device, means coupling each pick-up device to said activate circuit to respond upon enabling of said activate circuit followed by receipt of a code signal by its corresponding control element for conditioning the energizing circuits of the drive devices of a group of said function controls to condition each such drive device for actuation of its corresponding function control, and additional control elements each connected in the energizing circuits of the drive devices of certain of said function controls to provide a distinctive set of said function controls, each said set being made up of one function control from each group of function controls, each of the last named control elements being responsive to a particular distinctive control signal received after said first code signal has actuated one of said first named control elements, to complete one of said last named energizing circuits such that a function control is selected only if the energizing circuit for its drive device is connected both in the group determined by the first code signal and in the set determined by the last named control signal.

9. In a signaling system, a selective calling receiver individually alertable in response only to a call signal representing the call number for said receiver, said receiver having a first plurality of distinctive frequency tone responsive elements for response to certain portions of the call signal, a second plurality of distinctive frequency tone responsive elements for response to other portions of the call signal, and an activate circuit energizable upon said receiver responding to its call signal through operation of certain of said first plurality of frequency responsive elements and certain of said second plurality of frequency responsive elements, a function control unit for effecting various equipment functions to which it is connected and having a number of circuit pick-up devices, a separate control element in a separate energizing circuit for each of said pick-up devices, each control element being responsive to a particular one of said first plurality of tone responsive elements to establish a circuit through its corresponding pick-up device, a plurality of function controls each including a drive device and a separate energizing circuit for each drive device, means coupling each pick-up device to said activate circuit to respond upon enabling of said activate circuit followed by receipt of a tone by a corresponding one of said first plurality of frequency tone responsive elements for conditioning energizing circuits of the drive devices of a group of said function controls to condition each such drive device for actuation of its corresponding function control, and additional control elements each connected in the energizing circuits of the drive devices of certain of said function controls to provide a distinctive set of said function controls, each said set being made up of one function control from each group of function controls, each of the last named control elements being responsive when a particular one of said second plurality of tone responsive elements responds to a tone received after actuation of said first named control elements to complete one of said last named energizing circuits such that a function control is selected only if the energizing circuit of its drive device is connected both in the group determined by the first tone and in the set determined by the second tone.

References Cited in the file of this patent

UNITED STATES PATENTS

| | | |
|---|---|---|
| 2,477,973 | Evers | Aug. 2, 1949 |
| 2,554,329 | Hammond | May 22, 1951 |
| 2,658,942 | Durkee | Nov. 10, 1953 |
| 2,701,279 | Lovell | Feb. 1, 1955 |
| 2,826,638 | Large | Mar. 11, 1958 |

FOREIGN PATENTS

| | | |
|---|---|---|
| 673,173 | Great Britain | Jun. 4, 1952 |